INVENTORS
JACOB GOLDBERG
ROBERT A. SHORT
BY Samuel Lindenberg
Abraham Wasserman
ATTORNEYS

JACOB GOLDBERG
ROBERT A. SHORT
INVENTORS

BY Lindenberg & Freilich

ATTORNEYS

INVENTORS
JACOB GOLDBERG
ROBERT A. SHORT
BY Samuel Lindenberg
Abraham Wasserman
ATTORNEYS United States Patent Office 3,378,776
Patented Apr. 16, 1968

3,378,776

DATA SHIFTING LOGIC SYSTEM WITH DATA AND CONTROL SIGNALS ADVANCING THROUGH THE SYSTEM IN OPPOSITE DIRECTIONS

Jacob Goldberg, Palo Alto, and Robert A. Short, Redwood City, Calif., assignors to Stanford Research Institute, Menlo Park, Calif., a corporation of California
Filed Oct. 9, 1964, Ser. No. 402,799
18 Claims. (Cl. 328—37)

This invention relates to logic circuitry and, more particularly, to an improved controlled logic system for data transmission.

In present day computers, a great variety of controlled logic systems are employed to shift or transfer data over a line consisting of a plurality of stages. Such systems are generally referred to as shift registers. Data propagates or flows down the line of such a register by transferring or shifting between adjacent stages in response to control pulses. In most presently known systems, the control pulses flow down the register line in the same direction that the data is being transferred. Each control pulse energizes each stage to store the data supplied thereto from the stage preceding it. Thus, the data is shifted forward by one stage per control pulse, with both control pulses and data flowing in the same direction, namely from each stage to the succeeding stage thereof.

Such systems, though operative, are subject to inherent limitations including loss of some of the data or information to be transmitted. Basically, the limitations result from operational variations between the stages on the register line and the time delays associated with the transfer of information therebetween as well as the transfer of control pulses from each preceding stage to the one following it. As a result, there is an ever-present probability that a first of two successive control pulses will energize one of the stages to store the data from the stage preceding it, and before such data transfer can be completed, the second of the two successive control pulses will again energize the stage, resulting in an overlap of control pulses therein, and the consequent loss of one of them.

The inevitable result from the loss of one of the control pulses along the line of the successive stages is that part of the data in the stages preceding the point where such a pulse has been lost moves or flows forward. However, the data in stages following the point where such a controlled pulse has been lost, will not be affected. Hence, at one point or stage along the line, an overlap of data to be transferred will occur. Consequently, some of the overlapped data in the stage subjected to two successive control pulses within a time period too short for the stage to perform the necessary storing operation will be lost, resulting in an error in the system's performance. Such an error is not due to failure of any individual stage, but rather to the compiled time delay effect produced between and within the number of successive stages in which data is transferred from one to the other in response to control pulses, flowing in the same direction as the flow of the data.

Accordingly, it is an object of the present invention to provide an improved controlled logic system for transmitting data.

Another object of the present invention is the provision of an improved controlled logic system wherein overlap of data is eliminated.

Another object of the present invention is to provide a substantially error-free data transmission system.

Still another object of the present invention is the provision of a data transmission system wherein random operational time variations within the system do not result in loss of data to be transmitted.

A further object of the present invention is the provision of a controlled logic system for transmitting data over a line comprised of a plurality of stages which is not affected by delay variations between the stages with respect to controlling signals.

These and other objects of the present invention may be achieved by providing a controlled logic system wherein control pulses energize each stage of a plurality of successive stages, to store the data in the stage preceding it. The control pulses are supplied to each one of the plurality of stages from its respective succeeding stage. Thus, the control pulses flow in the line in the direction opposite to the direction of flow of the data which is transferred from stage to stage. For explanatory purposes, the present invention may be thought of as an anti-parallel controlled logic system due to the opposite directions of flow of the data and the control pulses therethrough.

Briefly, according to the teachings of the present invention, each stage is connected to its adjacent stages so that the data stored in the preceding stage may be shifted or transferred to the particular stage, after the data stored in the stage has been shifted to the succeeding stage thereof. On the other hand, the control pulses which flow in a direction opposite to the direction of flow of the data are supplied to each stage from the succeeding stage thereof. Inherent operational variations between stages are accounted for by controlling the operation of each stage so that once energized by a first control pulse, a minimum recovery time must elapse before the stage can be energized by a subsequent control pulse. The minimum recovery time is a function of the specific characteristic of the stage, as well as its interconnections with adjacent stages. Whenever a second control pulse energizes any of the stages before the end of the minimum recovery time of the particular stage, the second pulse is blocked from flowing to succeeding stages. Also, the data in the particular stage is erased by nulling the stage, that is by storing a special spacer symbol therein, thus creating a gap in the data stored in the line. However, such a created gap does not result in a loss of data, since the data previously stored in the nulled stage has been transferred to the stage succeeding it. Rather, the gaps produced result in a dispersion of the information over the line of stages without losing any portion thereof.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1(*a*) is a multiline waveform diagram, useful in explaining the invention;

Figure 1:
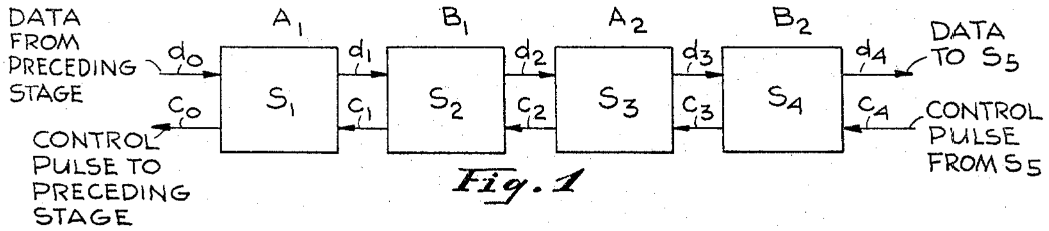
FIGURE 1 is a block diagram of a control logic data transmission system of the present invention.

Reference is now made to FIGURE 1 which is a block diagram of a control logic data transmission system of the present invention. Therein are shown four successive stages designated S1 through S4, the stages comprising a portion of a line over which data is to be transmitted. Data lines $d_1$, $d_2$, and $d_3$ are shown interconnecting the stages S1 through S4 so that data stored in any of the stages may be transmitted to the succeeding stage thereof. In addition, data lines $d_0$ and $d_4$ are shown in FIGURE 1. Data line $d_0$ interconnects the stage S1 with a preceding stage thereof (not shown), and data line $d_4$ interconnects the stage S4 with a succeeding stage thereof S5 (not shown). Also, control pulses are supplied to each one of the stages S1 through S4 by means of control lines $c_1$ through $c_4$ respectively. A control line $c_0$ is shown interconnecting S1 to the stage preceding it so that the control pulse generated in the stage S1 may be supplied to the preceding stage thereof. From FIGURE 1, it is seen that the directions of flow of the data and the control pulses are opposite one another. The data flows from each stage to the stage succeeding it whereas, the control pulses flow from each stage to its preceding stage, such an arrangement comprising an anti-parallel control logic system as hereinbefore defined.

Figure 2:
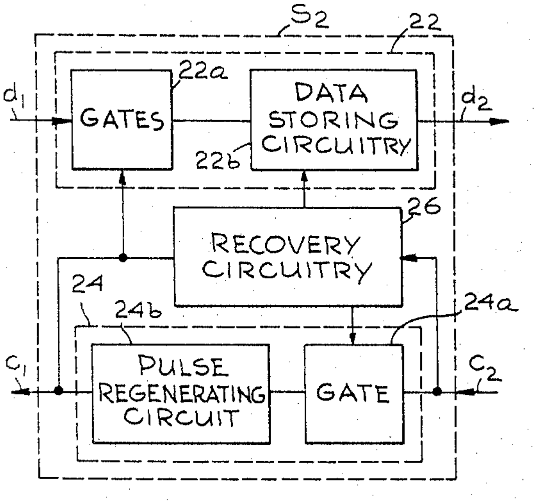
FIGURE 2 is a block diagram useful in explaining the operation of one of the stages shown in FIGURE 1.

Reference is now made to FIGURE 2 which is a block diagram of one stage useful in explaining the teachings of the present invention. As seen therein, the stage S2, selected for explanatory purposes only, comprises a data circuitry 22 connected between the data lines $d_1$ and $d_2$ and a control pulse circuitry 24 connected between the control lines $c_1$ and $c_2$. In addition, the stage S2 comprises a recovery circuitry 26 connected to the control lines $c_1$ and $c_2$ as well as an input gate 24*a* of the control pulse circuitry 24.

In operation, a control pulse supplied to the stage S2 from the succeeding stage thereof via the control line $c_2$ passes through the gate 24*a* to a pulse regenerating circuitry 24*b* of the circuitry 24. The pulse regenerating circuit 24*b*, after a predetermined time hereinafter also referred to as the regenerated delay time, produces a control pulse which is supplied via the control line $c_1$ to the preceding stage S1. The pulse produced by the pulse regenerating circuit 24*b* is also supplied to gates 22*a* of the data circuitry 22, so that data, supplied to the stage S2 from the preceding stage S1 via the data line $d_1$, may be stored in a data storing circuit 22*b* of the data circuitry.

The control pulse produced by the circuit 24*b* is also supplied to the recovery circuitry 26. Therein, a pulse of a width corresponding to the minimum recovery time of the stage S2 is generated. During the generation of such pulse, the gate 24*a* is disabled by the recovery circuitry 26 so that if a second control pulse is supplied to the stage S2 via the control line $c_2$, it is prevented from passing to and energizing the pulse regenerating circuit 24*b*. However, if a second pulse is supplied to the stage S2 via the control line $c_2$, it triggers the recovery circuit which in turn produces a nulling signal, supplied to the data storing circuitry, so that any data stored therein is erased. Erasing the data stored in the data storing circuitry 22*b* will hereinafter also be referred to as nulling the stage such as the stage S2 shown in FIGURE 2. If however, the second control pulse supplied to the stage S2 arrives after the minimum recovery time of the stage, the gate 24*a* will no longer be disabled by a signal from the recovery circuitry 26 so that the second control pulse may be supplied to the pulse regenerating circuit 24*b*. Therein, the second control pulse is regenerated and supplied on the control line $c_1$ as well as to the recovery circuitry 26 and the gates 22*a* of the data circuitry 22 as hereinbefore described.

From the foregoing description, it is seen that as long as two consecutive control pulses are not supplied to the stage S2 within a time period shorter than the minimum recovery time thereof, each one of the control pulses will be supplied to the pulse regenerating circuit 24*b* wherein it is regenerated and supplied to the preceding stage. The regenerated control pulse is also used to enable the stage to store the data supplied thereto from the preceding stage. However, if two consecutive control pulses are supplied to a stage within a time period shorter than the minimum recovery time of the stage, the first of the two control pulses will be regenerated within the stage and supplied to the preceding stage thereof as well as enable the stage to store the data supplied thereto from the preceding stage. But, the second control pulse which will be blocked from passing to preceding stages, will trigger the recovery circuitry of the respective stage to null the stage by erasing the data from the preceding stage which has been temporarily stored in the data storing circuitry thereof. Yet, such nulling of a stage does not result in a loss of any of the data to be transmitted, but rather, only produces a dispersion of the data to be transmitted between the successive stages.

For a better understanding of the dispersion phenomena occurring in the control logic system of the present invention, reference is again made to FIGURE 1, and to FIGURE 1(*a*) which is a multiline waveform diagram useful in explaining the following exemplary sequence of operation. Let us assume that stages S1 through S4 store at a time *t1* data symbols A1, B1, A2, and B2, respectively, as shown in lines *a* through *c* of FIGURE 1(*a*). Thereafter, at time *t2*, a pulse P1 is supplied to the stage S4 via the control line *c4* so that the stage S4 at a time *t3*, equalling *t2* plus the time delay introduced in the stage S4 by circuit 24*b* in regenerating the control pulse, stores the data symbol A2 supplied thereto from the preceding stage S3. See lines *f*, *g* and *d* of FIGURE 1(*a*). Thus, after time *t3*, stages S1 through S4 store data symbols A1, B1, A2 and A2, respectively. The data symbol B2 previously stored in the stage S4 has been transferred to the succeeding stage S5 (not shown) by the pulse P1 prior to its energizing the stage S4. The pulse P1 at time *t3* will be supplied to the stage S3 so that at a time *t4*, equalling the time *t3* plus the delay time necessary in regenerating the control pulse in the circuit 24*b* of stage S3, a control pulse is produced in the stage S3, which energizes it to store the data symbol B1 supplied thereto from the preceding stage S2. See lines *h*, *i* and *c* of FIGURE 1(*a*). Therefore stages S1 through S4 store at time *t4*, data symbols A1, B1, B1, and A2, respectively, with stage S5 storing data symbol B2 previously transferred thereto from stage S4.

Let us assume that before a time *t5*, a control pulse P2 is produced in the stage S5 (not shown) so that the stage temporarily stores the data symbol A2 in the stage S4 preceding the stage S5, and that pulse P2 is supplied to S4 at time *t5*. At time *t5*, data symbols A1, B1, B1, A2 and A2 are respectively stored in stages S1 through S5. Let is further be assumed that the minimum recovery time of S4 is represented by a pulse, generated by circuitry 26 of S4 and at *tm*. If *t5* occurs after *tm*, that is, the time difference between *t5* and *t2* at which pulses P2 and P1 respectively are supplied to S4 is more than the minimum recovery time of S4, pulse P2 will be regenerated in S4. Then, after the regeneration time, produced by circuit 24*b* of stage S4, pulse P2 will be supplied to stage S3 via $c_3$, as well as used to store the data B1 from stage S3 in stage S4. If however, *t5* occurs before *tm*, that is, the time difference between times *t5* and *t2* at which the control pulses P2 and P1 respectively are supplied to the stage S4 is less than the minimum recovery time of the stage S4, then, in light of the foregoing description, the pulse P2 at time *t5* is blocked from being regenerated in the stage S4. Also, pulse P2 energizes the recovery circuitry of stage S4 so that the stage is nulled; namely, the data symbol A2 stored therein is erased. When the data symbol is erased in stage S4, the symbols stored in stages S1 through S5 are A1, B1, B1, Null, and A2. It is thus seen that by erasing the data symbol A2 from the stage S4, none of the data to be transmitted is lost, since prior to erasing the data from stage S4, the data symbol A2 has previously been transferred from it to S5. In addition, data symbols A1, B1 and B1, are still stored in stages S1, S2, and S3 respectively, under the assumption that P1 is still between S2 and S3.

In FIGURE 1(*a*) the pulse P2 which is supplied at *t*5, occurring after *tm*, is shown in line *f* by dashed lines. Also, the time *t*5 occurring after *tm*, the regeneration of P2 in circuit 24 of S4 and the pulse P2, supplied at $c_3$ are shown by dashed lines. On the other hand P2 which occurs at *t*5 prior to *tm* is shown by solid lines.

The pulse P2, once blocked in the stage S4, will not flow down and energize stages S1 through S3. However, the preceding control pulse P1 will continue to flow from each stage to the preceding stage thereof. As a result, pulse P1 will be supplied from stage S3 to stage S2 via control line $c_2$ so that the stage S3 will store the data symbol A1 stored in stage S1. Thereafter, the pulse P1 will continue to flow between stages and will be supplied by the stage S2 via control line $c_1$ to stage S1, so that the latter stage may store the data symbol stored in a stage preceding it, such data symbol being supplied thereto via the data line $d_0$.

From the foregoing description, it is seen that as a result of the control pulse P1 flowing down the line of stages S1 through S4 by being supplied from each stage to the stage preceding, and the pulse P2 which is blocked by the stage S4, data symbols A1, B1, and A2 are stored in stages S2, S3, and S5 respectively, with stage S4 being in the null state hereinafter being designated by a data symbol X. However, despite the stage S4 being in the null state, none of the data symbols to be transferred is lost. Rather, a dispersion of the data to be transmitted results, with a gap being introduced between the data symbols B1 and A2 which are stored in stages S3 and S5 respectively. The loss of the control pulse P2 hereinbefore described, thus results in a void or hole being created in the data stored on the line, but does not produce a loss of any of the information to be transmitted. Indeed, a large number of lost control pulses will only result in a greater and greater dispersion, rather than a greater degree of overlapping of the data to be transmitted. Consequently, none of the data to be transmitted is lost.

Figure 3:
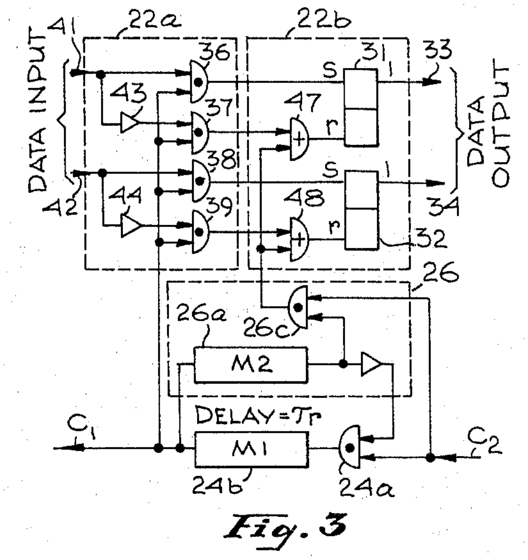
FIGURE 3 is a detailed block diagram of one embodiment of a single stage of the present invention.

Reference is now made to FIGURE 3 which is a detailed block diagram of one embodiment of a single stage of the present invention. Elements in FIGURE 3 which are similar to those previously described will be designated by like numerals. The arrangement shown in FIGURE 3 is adapted to store binary symbols in a pair of flip-flops 31 and 32. For explanatory purposes, let it be assumed that when the flip-flops 31 and 32 are in states one (1) and zero (0) respectively, that the stage is presumed to store a binary "1," whereas when the flip-flops 31 and 32 are in a zero and one states, the stage is presumed to store a binary "0." Also, whenever the flip-flops 31 and 32 are both in the zero state, the stage is presumed to be in the null state previously explained. Data lines 33 and 34 are connected to the flip-flops 31 and 32 respectively so as to provide signals indicative that either one of the flip-flops is in state one. The data lines 33 and 34 perform a function similar to that performed by the data line $d_2$ hereinbefore described in conjunction with FIGURE 2; namely, they supply the binary information stored in the stage S2 to the succeeding stage S3. The control pulse circuitry 24 shown in FIGURE 3 comprises an And gate 24*a* and a conventional one shot multivibrator 24*b* which performs the function of the pulse regenerating circuit previously described.

Let us assume that a control pulse P3 passing through the gate 24*a* triggers the multivibrator 24*b*. The multivibrator then produces an output control pulse which in addition to being supplied to the preceding stage via the control line $c_1$, is also supplied to one input line of input AND gates 36 through 39. The other input lines to the gates 36 and 38 are directly connected to input lines 41 and 42 respectively, such input lines performing the same function as the data line $d_1$. Namely, lines 41 and 42 supply the stage S2 with the binary state of the flip-flops of the preceding stage. Second input lines of the gates 37 and 39 are coupled to the input lines 41 and 42 through respective inverter circuits 43 and 44. Thus, whenever the And gates 36 through 39 are enabled by the output control pulse of the multivibrator 24*b*, the binary information stored in the preceding stage is supplied to the stage S2 via the input lines 41 and 42, and is temporarily stored in the flip-flops 31 and 32. For example, if the steady state levels on the input lines 41 and 42 are such as to indicate that the flip-flops in the preceding stage which correspond to flip-flops 31 and 32 are in states one and zero respectively, namely, the preceding stage stores a binary "1," And gates 36 and 39 will produce output signals which will set the flip-flop 31 so that it is in a state one and will reset the flip-flop 32 to a state zero. However, whenever the preceding stage stores a binary "0," namely, the level on the input line 42 corresponds to an output of a flip-flop in state one and the level on line 41 corresponds to an output of flip-flop in state zero, gates 37 and 38 will produce output signals so that flip-flop 31 is reset, and flip-flop 32 is set. Thus, the output of the stage S2 on lines 33 and 34 comprises levels which represent flip-flops being in states zero and one respectively.

The arrangement shown in FIGURE 3 further comprises the recovery circuitry 26 which includes a one shot multivibrator 26*a* energized by the control pulse produced by the multivibrator 24*b*. The multivibrator 26*a* is connected to the And gate 24*a* through an inverter circuit 26*b*. Thus, whenever the multivibrator 26*a* is energized by the output control pulse of the multivibrator 24*b*, it produces a pulse of a width which is equal to the minimum recovery time of the stage S2. During such recovery time, the gate 24*a* is inhibited thereby preventing any additional control pulses from being supplied via the control line $c_2$ to the multivibrator 24*b*. The multivibrator 26*a* is also connected to one input line of an And gate 26*c*, the other input line thereof being connected to the control line $c_2$. Thus, during the presence of the output signal from the multivibrator 26*a*, one of the inputs of the gate 26*c* is energized, so that if a control pulse appears on the control line $c_2$ during that period, the second of the input lines of the gates 26*c* is energized so that an output signal is produced therefrom.

An output line of the And gate 26*c* is connected to a pair of Or gates 47 and 48, respectively interposed between the And gates 37 and the reset input of the flip-flop 31 and the And gate 39 and the reset input of the flip-flop 32. Whenever an output signal is produced by the And gate 26*c*, the Or gates 47 and 48 are energized to produce respective output signals which reset both flip-flops 31 and 32 so that they are set in the zero state. Since both flip-flops 31 and 32 are set in the zero state, the stage is presumed to be nulled and any binary information stored therein is erased. If however, a control pulse does not appear during the time that the multivibrator 26*a* produces an output signal, the And gate 26*c* is not energized so that the Or gates 47 and 48 do not reset the flip-flops 31 and 32 to null the stage. After the minimum recovery time has passed, the multivibrator 26*a* no longer produces an output signal, so that And gate 24*a* is re-enabled. As a result, a subsequently arriving control pulse is supplied therethrough to the multivibrator 24*b*. Such a pulse is regenerated therein and again supplied to the preceding stage via the control line $c_1$ as well as being supplied to the And gates 36 through 39 to enable the stage to store the binary information stored in the preceding stage thereof.

From the foregoing description, it can be seen that the arrangement shown in FIGURE 3 operates in a manner such that a stage, upon being energized by a control pulse, stores therein the data from the preceding stage and also supplies a control pulse to the preceding stage. However, whenever a second control pulse is supplied to the stage within a time period which is shorter than a minimum recovery time necessary for the stage to complete the storing operation, the stage is nulled, thereby erasing any information stored therein. In the foregoing description, the minimum recovery time is controlled by adjusting the pulse width of the output signal produced by the multivibrator 26*a*. The recovery time is set to be somewhat greater than the propagation delays associated with the inter-stage control and data lines as well as the delay introduced in the regeneration of the control pulse and the time required for the actual storing of the information supplied to the stage from the preceding stage thereof. Such an arrangement insures that the new data supplied from the preceding stage has time to arrive and stabilize at the inputs of any given stage before such a stage is again activated by a succeeding control pulse.

Figure 4:
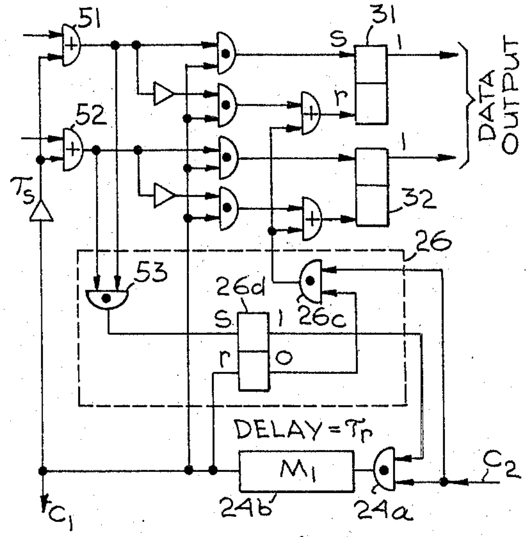
FIGURE 4 is a detailed block diagram of another embodiment of a single stage of the present invention.
Figure 1A:
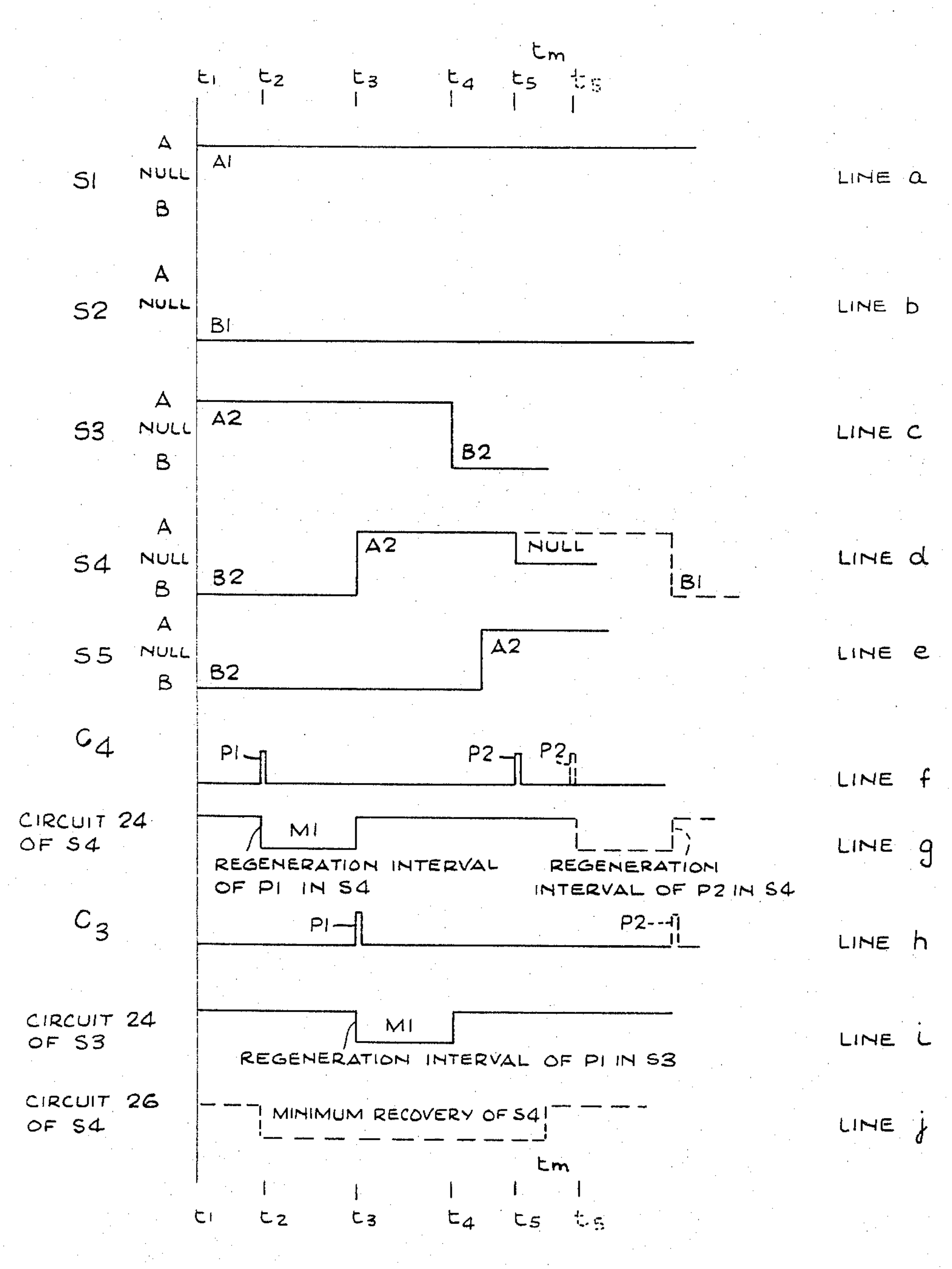

Reference is now made to FIGURE 4 which is a block diagram of another arrangement of a single stage of the present invention. As shown therein, the recovery circuitry 26 is different from the recovery circuitry hereinbefore described, in that the minimum recovery time necessary for the proper operation of the stage is not internally set. Rather, it is controlled by the actual delays introduced by the data and control lines interconnecting the stage with the preceding stage thereof. As seen from FIG. 4, the minimum recovery time is controlled by the state of a flip-flop 26*d* which, when being in a one state, enables the And gate 24*a* so that a control pulse may be supplied to the one shot multivibrator circuit 24*b*. As soon as the circuit 24*b* regenerates the output control pulse, the flip-flop 26*d* is reset, thereby starting the recovery period by disabling the gate 24*a* from supplying a subsequent control pulse therethrough to the circuit 24*b*. While in the recovery period, further control pulses supplied to the stage are gated by the And gates 26*c* to energize the Or gates 47 and 48 so as to null the state as required. The recovery period ends only after the circuit 24*b* of the preceding stage regenerates a control pulse which is supplied to the preceding stage, triggering it as well as Or gates 51 and 52 which are energized after a built-in delay indicated by $T_S$. Whenever the Or gates 51 and 52 are energized, their outputs produce levels indicative of a state one, the two levels being supplied to the two inputs of an And gate 53. The output of the And gate 53 is then used to set the flip-flop 26*d* and thereby terminate or end the recovery period of the stage.

The arrangement shown in FIGURE 4 is particularly useful whenever the propagation delays present in the data and control lines are quite variable. Since, by using stages each one of which exhibits a recovery period which is determined by the characteristic of the particular stage, as well as the stages adjacent thereto, data may be more speedily transmitted through the plurality of stages of the line.

Figure 5:
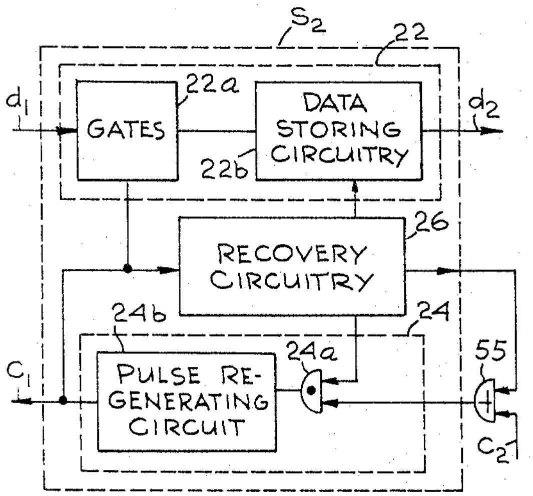
FIGURE 5 is a simplified block diagram of another embodiment of a single stage of the invention.

From the foregoing description, it is seen that the operation of the control logic system of the present invention is based on the ability of each stage to store therein the data received from a preceding stage, in response to a control pulse received from a succeeding stage thereof. However, such data received from a preceding stage is erased or nulled whenever two consecutive control pulses are supplied to the stage within a time period which is less than the required recovery time of the stage. Once nulled, no useful information is stored in the stage until a subsequent, namely a third control pulse, is externally supplied thereto. Reference is now made to FIGURE 5 which is a simplified block diagram of a preferred arrangement of a single stage of the present invention. As seen therein, the arrangement shown in FIGURE 5 is similar to the arrangement of the stage S2 shown in FIGURE 2. In FIGURE 2, the control pulses from a succeeding stage are supplied via the control line $c_2$ directly to the gate 24*a* of the control pulse circuitry 24. However, in the preferred arrangement of FIGURE 5, control pulses from a succeeding stage are supplied via the control line $c_2$ to the And gates 24*a* through an Or gate 55. Another input line of the Or gate 55 is shown directly connected to the recovery circuitry 26. As previously explained, in accordance with the teachings of the present invention, if a control pulse arrives at a stage while the stage is in its recovery period, such a control pulse is inhibited from flowing to preceding stages thereby becoming lost. In addition, the inhibited pulse nulls the stage from storing any useful information therein.

The stage shown in FIGURE 5 tends to reduce the loss of such a control pulse by providing an internally generated control pulse at the end of any null period therein. As soon as the null period ends, if during such period the stage has been nulled, the recovery circuitry 26 supplies a pulse to the Or gate 55 which in turn energizes through the And gate 24*a* the pulse regenerating circuit 24*b*. Thus, even though a control pulse has been lost in the stage, as soon as the null period ends, the pulse supplied by the recovery circuitry 26 to the Or gate 55 acts as a new internally generated control pulse. The internally generated control pulse acts in a manner similar to any of the control pulses supplied from the succeeding stage. Namely, after being regenerated within the stage, it flows to the preceding stage thereof as well as energize the gates 22*a* so that the stage may store the information supplied thereto from the preceding stage. Thus, it is seen that even though an externally supplied control pulse may be lost within a stage, as soon as the null period ends, the stage regenerates its own control pulse so that the overall period during which no information is stored in the stage is considerably reduced.

Hereinbefore, the teachings of the present invention have been described in connection with the transfer of data from one stage to the succeeding stage thereof, such an arrangement being shown for example, in FIGURE 1. The teachings of the present invention however, are similarly applicable to control logic systems wherein data is transmitted between stages in which the data from a plurality of stages are supplied to a single stage. Also, data stored in a single stage may be supplied to a plurality of succeeding stages. Such an arrangement is shown in block diagram form in FIGURE 6, to which reference is made herein. As seen therein, data stored in a stage S6 is transferrable to a stage S7 by means of a data line $d_7$. Control pulses are supplied to the stage S6 from the succeeding stage S7 by means of a control line $c_7$. In addition, stage S6 is shown connected to two preceding stages R1 and R2. The data stored in the stages R1 and R2 is supplied to the stage S6 by means of data lines $d_5$ and $d_6$ respectively. In turn, the control pulses from the stage S6 are supplied by means of control lines $c_5$ and $c_6$ to stages R1 and R2 respectively. The stage S6 in relationship to stages R1 and R2 may be considered as a fan-in stage, since the data from the stages R1 and R2 is fanned into it. The stage S7 on the other hand, may be thought of as a fan-out stage, since the data stored therein is fanned out to a plurality of stages R3 and R4. The data from S7 is supplied by means of data lines $d_8$ and $d_9$ respectively. The stages R3 and R4 supply control pulses to the preceding fan-out stage S7 by means of control lines $c_8$ and $c_9$ respectively.

The fan-in stage S6 comprises circuitry similar to that of stage S2 hereinbefore described. However, in addition, it also comprises fan-in logic circuitry which controls the data and control pulse interrelationship between the fan-in stage S6 and the preceding plurality of stages R1 and R2. The fan-in logic circuitry operates so that the stage S6 accepts and stores a valid data symbol therein only if valid data symbols are present on all its data input lines, such as $d_5$ and $d_6$ (see FIGURE 6). In addition, if any invalid data symbol is present on any of the input lines, then the fan-in stage S6 will supply control pulses only to the stage supplying the invalid data symbol. It is thus seen that the fan-in stage S6 will produce and store a valid data symbol, which is in a selected functional relationship with the data supplied thereto from stages R1 and R2, only when a second control pulse is supplied to the stage S6 from the stage S7 after the minimum recovery time of the stage S6. In addition, such storage will occur in fan-in stage S6 only if all the preceding stages R1 and R2 supply the stage S6 with valid data symbols. Further, if any of the data inputs to the fan-in stage S6 is invalid, control pulses will be sent from S6 only to those stages that have not presented a valid data symbol. In this way, valid data symbols are consistently indexed forward until the proper synchronism of valid data symbols occurs on all the data inputs to the fan-in stage S6.

The fan-out stage S7 which includes circuitry similar to that of stage S2 hereinbefore described, also includes fan-out logic circuitry which controls the interrelationship of the fan-out stage S7 with the succeeding stages R3 and R4. The fan-out logic circuitry is operable so that the data symbol stored in the stage S7 is retained therein until all the succeeding stages R3 and R4 have sampled such data symbol. Furthermore, once a stage such as R3 has copied the contents of the fan-out stage S7, the subsequent inputs to the stage R3 must be the null data symbol until such time as stage S7 stores a new symbol. In addition, S7 itself must not produce an output control pulse until the data symbol stored therein has been properly transferred to all the succeeding stages.

The operational requirements of the fan-in logic circuitry and the fan-out logic circuitry hereinbefore described, are basic to a satisfactory operation of a multistage control logic system for data transmission in accordance with the teachings of the present invention. The fan-in and fan-out logic circuit may be implemented in a variety of ways by those familiar with the art. The specific implementation of each of the circuits will depend on the number of stages which are to fan in or fan out of a single stage, as well as the particular functional interrelationship of such a plurality of stages.

Figure 6:
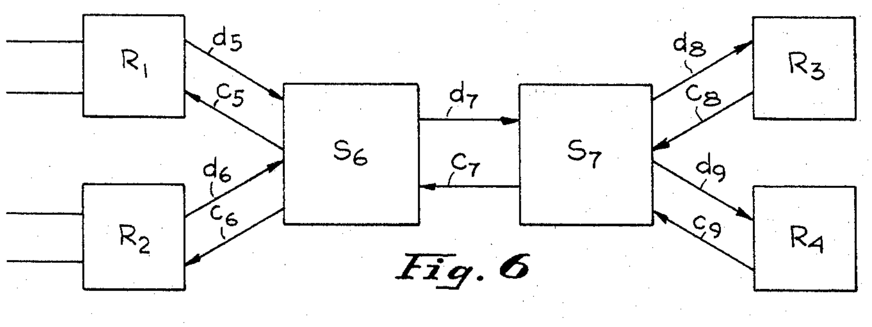
FIGURE 6 is a block diagram of a fan-in and fan-out arrangement in accordance with the teachings of the present invention.
Figure 7:
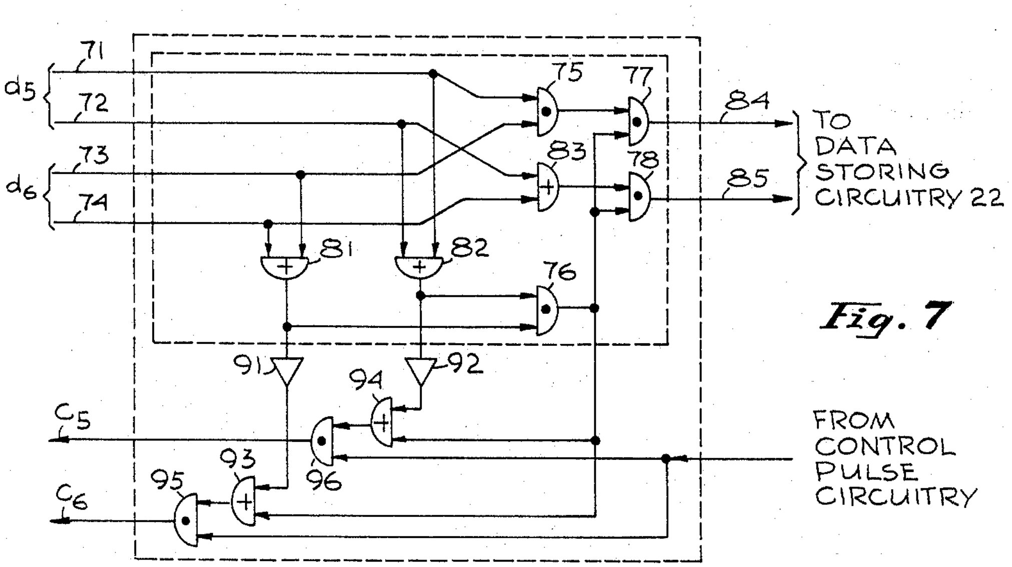
FIGURE 7 is a partially detailed block diagram of the fan-in portion of the arrangement shown in FIGURE 6.

Reference is now made to FIGURE 7 which is a partially detailed block diagram of a fan-in logic circuit of the fan-in stage S6 shown in FIGURE 6. For explanatory purposes, let us assume that the stage S6 is to perform the binary AND operation on the data inputs from stages R1 and R. As seen from FIGURE 7, the fan-in logic circuitry comprises data lines 71 and 72 which interconnect the stage S7 with the preceding stage R1, in a manner similar to that performed by the data line $d_5$ shown in FIGURE 6. Similarly, data lines 73 and 74 interconnect the stage with the preceding stage R2, in a manner similar to that performed by the data line $d_6$. And gates 75 through 78, as well as OR gates 81, 82 and 83 are used to perform the binary AND operation on the binary signals supplied from the preceding stages R1 and R2, as well as prevent such data from being supplied to the stage S6 unless valid binary symbols are supplied from all the preceding stages. Whenever binary "1's" are supplied from both stages R1 and R2, by providing state one levels on lines 71 and 73, and state zero levels on lines 72 and 74, the And gate 75 is energized to produce a state one level on a line 84. At the same time, neither of the input lines of the Or gate 83 are energized, so that the level on line 85 remains at a state zero level. Thus, a binary "1" is supplied to the data storing circuitry 22 of the stage S6 by the levels on lines 84 and 85 representing states one and zero respectively. However, whenever one of the preceding stages R1 or R2 supplies a binary "1," and the other stage supplying a binary "0," or whenever both stages supply binary "0's," the level on line 84 corresponds to a state zero with the level on the line 85 corresponding to a state one. Thus, a binary "0" is supplied to the data storing circuitry 22 of the fan-in stage S6.

As seen from FIGURE 7, the passage of data to the data storing circuitry 22 is controlled by the And gates 76, 77 and 78 as well as the Or gates 81 and 82. Data transfer to stage S6 occurs only when the And gates 77 and 78 are energized by an output signal from the And gate 76. And gate 76 is in turn controlled by the Or gates 81 and 82, both of which must be energized before the And gate 76 will produce an output signal. Or gate 82 is energized only when a level of a state one is present on either data input line 71 or 72. Namely, the Or gate 82 is energized only when the stage R1 supplies a binary "1" or a binary "0." However, if the stage R1 is in the null stage, namely, the levels of both input lines 71 and 72 are in the zero state, the Or gate 82 is not energized. Consequently, And gate 76 does not produce an output signal which in turn blocks the transfer of any data to the stage S6. Similarly, the Or gate 81 is energized only when a binary "1" or a binary "0" is stored in the stage R2. It is thus seen that for data to be transferred to the data storing circuitry 22 of the fan-in stage S6, valid binary signals must be stored in both preceding stages R1 and R2.

The fan-in logic circuitry shown in FIGURE 7 further comprises inhibit or Not gates 81 and 92, Or gates 93 and 94, and And gates 95 and 96. The gates 91 through 96 are used to control the supply of control pulses from the stage S6 to the preceding stages R1 and R2. The pulses are controlled so that the stage S6 supplies control pulses only to a preceding stage which exhibits an invalid data symbol such as a null symbol in the event that all preceding stages do not exhibit valid symbols. Also, stage S6 supplies control pulses to all preceding stages in the event that all of them exhibit valid signals. For example, if stage R2 does not store a valid binary "1" or "0," namely the stage R2 is in the null state, the Or gate 81 is not energized. Consequently, the Not gate 91 produces an output signal. The output signal of the Not gate 91 triggers the And gate 95 through the Or gate 93 so that a control pulse from the stage S6 passes through the And gate 95 to the stage R2 by means of control line $c_6$. Similarly, whenever the stage R1 does not produce a valid binary signal of a binary "1" or binary "0," the Or gate 82 is not energized which as a consequence, results in an output signal being produced by the Not gate 92. The output signal of the Not gate 92 energizes the And gate 96 through the Or gate 94, so that a control pulse may pass to the stage R1 by means of control line $c_5$. In the event that both stages R1 and R2 exhibit valid symbols, the Or gates 81 and 82 are energized, which causes And gate 76 to be energized. As a result, Or gates 93 and 94 are energized, thereby permitting control pulses to pass to stages R1 and R2 via the energizing of And gates 95 and 96. It is thus seen that the arrangement shown in FIGURE 7 properly performs the operational requirements of a fan-in logic circuitry to a fan-in stage which is to perform a binary AND operation on two binary signals supplied thereto from preceding stages.

Figure 8:
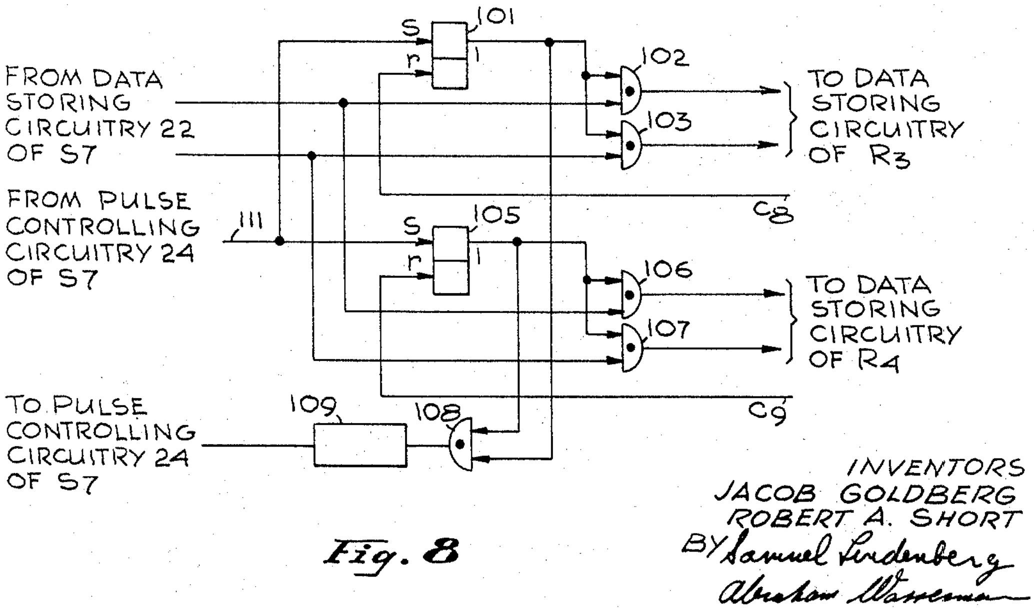
FIGURE 8 is a partially detailed block diagram of the fan-out portion of the arrangement shown in FIGURE 6.

Reference is now made to FIGURE 8 which is a partially detailed block diagram of a fan-out logic circuit of the fan-out stage S7 shown in FIGURE 6. Stage S7 fans out data to succeeding stages R3 and R4. In FIGURE 8, a flip-flop 101 is shown controlling the supply of data from the stage S7 to the succeeding stage R3. When the flip-flop 101 is in the set state, enabling pulses are supplied from the output thereof to gates 102 and 103, thereby enabling the data stored in the data storing circuitry 22 of the stage S7 to be directly supplied to the data storing circuitry of the succeeding stage R3. As soon as the newly supplied data is stored in the stage R3, a control pulse is supplied via the control line $c_8$ which resets the flip-flop 101. Thereafter, the data signal levels supplied to the stage R3 from And gates 102 and 103 indicate the null stage until such time that the flip-flop 101 is again set so as to enable the And gates 102 and 103.

Similarly, a flip-flop 105 is used to control the supply of data from the fan-out stage S7 to the succeeding stage R4. Whenever the flip-flop 105 is in a set state, enabling signals are supplied to And gates 106 and 107 so that the data stored in the stage S7 are directly supplied as input levels to the succeeding stage R4. As soon as such data is stored in R4, a control pulse is supplied via control line $c_9$ resetting the flip-flop 105. The data stored in the fan-out stage S7 will not be altered until all succeeding stages sample such data. As soon as this occurs, all the flip-flops in the fan-out logic circuitry are reset, thus triggering through an And gate 108 a one shot multivibrator 109. The output of multivibrator 109 is used as the control pulse supplied to the stage S7 so that the data stored in a stage S6 (preceding the stage S7) may be stored in the stage S7. As soon as the data from the stage S6 is stored in the stage S7, a pulse is supplied from the stage S7 to the fan-out logic circuitry thereof by means of a pulse line 111. The pulse on line 111 sets the flip-flops 101 and 105 thereby enabling the succeeding stages R3 and R4 to sample the newly stored data in the stage S7.

Accordingly, there has been described and shown herein a novel and useful control logic system for transmitting data over a line comprising a plurality of stages. The invention has been described in conjunction with the transmitting or shifting of binary "1's" and "0's." In addition, the fan-in circuitry shown in FIGURE 7 has been described in conjunction with the performance of a binary AND operation on binary data supplied from two preceding stages. It is to be understood, however, that the present invention is not to be construed as limited thereto. Modifications may be made by those familiar in the art of the arrangements shown without departing from the spirit and scope of the invention. Therefore, all such modifications and their equivalents are intended to fall within the scope of the invention as claimed.

What is claimed is:

1. A controlled data shifting system comprising a plurality of stages interconnected in an ordered succession, each of said stages including first means for providing a control signal to a preceding stage thereof in said ordered succession, by regenerating a control signal supplied thereto from a succeeding stage thereof, second means connected to said first means, responsive to said regenerated control signal for storing in said stage data supplied from the preceding stage thereof, and third means for controlling the data stored in said stage as a function of the time period between successive control signals supplied to said stage from the succeeding stage thereof.

2. A controlled data shifting system comprising a plurality of stages, each stage having input and output data terminals and input and output control signal terminals; means connecting the input data terminal and the output control signal terminal of each stage to the output data terminal and the input control signal terminal of the preceding stage thereof, and connecting the output data terminal and the input control signal terminal of said stage to the input data terminal and the output control signal terminal of the succeeding stage thereof; means for successively supplying a first control signal of a series of successive control signals to said plurality of stages, said first control signal being supplied to each stage from the succeeding stage being regenerated therein and supplied to the preceding stage; means for storing in each stage data supplied from a preceding stage in response to said control signal regenerated therein; and stage control means responsive to the control signal regenerated in each stage for controlling the data stored in said stage as a function of the time difference between the supply thereto of said first control signal and the supply of succeeding control signals.

3. A data shifting system comprising a plurality of stages arranged in a sequence, each of said stages having interconnected data-storing means, control signal means and stage control means; means for successively applying a first control signal of a series of successive control signals to said control signal means of each of said stages, from the control signal means of the immediately succeeding stage, said control signal means being responsive thereto to regenerate said first control signal therein so as to supply it to the preceding stage thereof; means for interconnecting the data-storing means of said stages to store in the data storing means of each stage data stored in the data-storing means of the preceding stage in response to said first control signal regenerated in said each stage; and stage means including means for connecting within each stage said stage control means to said data-storing means and said control signal means, to energize said stage control means with said regenerated first control signal in the stage for controlling the storing of data in said data-storing means as a function of the time period between said first control signal and a second control signal of said series of control signals supplied to said control signal means of said stage from the succeeding stage thereof.

4. A controlled data-transmitting system comprising a plurality of data-storing stages; means for interconnecting said plurality of stages to form a series of successive stages; signal control means for successively supplying a first control signal of a series of control signals to each of said stages, said first control signal being supplied to each stage from the succeeding stage thereosf; means for storing in each of said plurality of stages, data stored in a stage preceding it in said series of stages in response to said first control signal supplied by said stage to the preceding stage thereof; and means for controlling the data stored in each stage as a function of the minimum recovery time of each stage and the time period between the supply thereto of said first control signal and the supply of a second control signal in said series of control signals.

5. A controlled data-transmitting system comprising a plurality of successive data-storing stages; means for supplying data stored in each of said plurality of successive data-storing stages to the succeeding stage thereof; control means for successively supplying a first control signal of a series of successive control signals to each of said plurality of successive data-storing stages to store therein the information supplied thereto from the preceding stage thereof, said control means including means for supplying said first control signal to each stage from the succeeding stage thereof; and control means for storing the data in any one stage supplied from the preceding stage thereof whenever a second control signal in said series is supplied thereto after said first control signal within a time period which is greater than a preselected period, said preselected period being a function of at least the transmission characteristics of said one stage.

6. In a shift register wherein data is shifted from one stage to a succeeding stage, the stages being arranged to a selected sequence, the improvement comprising means for successively supplying a first control signal in a series of successive control signals to each of said stages from a succeeding stage thereof, said first control signal being regenerated within each stage and supplied to the immediately preceding stage; means for interconnecting said stages to store in each stage data supplied from the preceding stage thereof in response to said regenerated first control signal therein; and means included in each stage responsive to said first control signal regenerated in said stage for controlling the data stored in said stage as a function of the time difference between the supply of said first control signal to said stage and the supply of a succeeding control signal thereto.

7. A binary data-transmitting system comprising a plurality of stages arranged in a sequence, each of said stages having interconnected binary storing means, control signal means and multivibrator recovery means; means for succcssively applying a first control signal of a series of successive control signals to said control signal means of each of said stages, said first control signal being applied from the control signal means of the immediately succeeding stage, for regenerating said first control signal so as to supply said regenerator first control signal to the preceding stage thereof; means for interconnecting said binary storing means of said plurality of stages for storing in the binary storing means of each stage data stored in the binary storing means of the preceding stage in response to said first control signal regenerated in said stage; and means for connecting within each stage said multivibrator recovery means to said binary storing means and said control signal means, to energize said multivibrator recovery means that said first control signal regenerated in the stage for controlling the storing of binary data in said binary storing means as a function of the time period between the supply of said first control signal and a second control signal of said series of control signals to said ocntrol signal means of said stage from the succeeding stage thereof.

8. A binary data-transmitting system as recited in claim 7 wherein said control signal means comprises a one shot multivibrator for regenerating said first control signal therein, and gating means for blocking a second control signal from energizing said multivibrator means whenever the time period between said first control signal and said second control signal supplied to said multivibrator means is less than a predetermined period controlled by said multivibrator recovery means.

9. In a shift register wherein data is shifted between stages arranged in a predetermined succession, in response to control signals successively supplied in a series of control signals, the arrangement comprising a plurality of stages including first, second and third stages, each stage having input and output data terminals and input and output control signal terminals; means connecting said input data terminal of said first stage to the output data terminals of said second and third stages, and connecting said output control signal terminal of said first stage to the input control signal terminals of said second and third stages, said means further connecting said first stage to a succeeding stage thereof, and said second and third stages to preceding stages thereof by connecting the output data terminal and the input control signal terminal of each stage to the input data terminal and the output control signal terminal respectively of the succeeding stage; means including means for applying a first control signal to said first stage from the stage succeeding it for regenerating said first control signal therein so as to provide said regenerated first control signal to said second and third stages; means within said first stage responsive to said first control signal supplied thereto for storing therein data related to the data stored in said second and third stages; means for controlling the supply of said regenerated first control signal to said second and third stages as a function of the data stored in said second and third stages respectively; and means included in each of said plurality of stages for controlling the data stored in each stage as a function of the time difference between the supply to each stage of two successive control signals in said series of control signals.

10. In a system wherein data is shifted between stages arranged in a predetermined succession in response to control signals successively supplied in a series of control signals the arrangement comprising a plurality of stages including first, second and third stages each stage having input and output data terminals and input and output control signal terminals; means connecting said output data terminal of said first stage to the input data terminals of said second and third stages, and connecting said input control signal terminal of said first stage to the output control signal terminals of said second and third stages, said means further connecting said first stage to a preceding stage thereof and said second and third stages to preceding stages thereof by connecting the output data terminal and the input control signal terminal of each stage to the input data terminal and the output control terminal respectively of the succeeding stage; means including means for applying control signals from said second and third stages to said first stage for providing a regenerated control signal therein; means included in said first stage responsive to said regenerated control signal for storing in said first stage data supplied from the preceding stage thereof; means in said second and third stages responsive to control signals supplied thereto for storing in said second and third stages the data stored in said first stage; and means included in each of said plurality of stages for controlling the data stored in each stage as a function of the time difference between the supply to each stage of two successive control signals in said series of control signals.

11. In a shift register wherein binary data is shifted from one stage to another, each stage including binary data-storing means, the stages being arranged in a selected sequence, the arrangement comprising signal control means for successively supplying a first control signal to each of said stages, said first control signal which is one in a series of successive control signals being regenerated within each stage and supplied to the immediately preceding stage; means for interconnecting the binary data-storing means of said stages for storing in the binary data-storing means of each stage in response to the first control signal generated in said stage the binary data supplied from the binary data-storing means of the preceding stage; and recovery stage means included in each stage responsive to said first control means regenerated therein for controlling the storing of said binary data in said stage in response to a second control signal as a function of the time difference between the supply of said first and second control signals to said stage as related to the recovery period of said stage.

12. A shift register as recited in claim 11 wherein said recovery stage means include nulling means for nulling said binary data-storing means by erasing any binary data stored therein whenever the time difference between the supply of said first and second control signals to said stage is less than the recovery period of said stage.

13. A controlled data shifting system as recited in claim 1 wherein said third means further include nulling means for erasing the data stored in said stage by said second means whenever the time period between successive control signals supplied to said stage is less than a preselected recovery period.

14. A controlled data shifting system as recited in claim 13 wherein said stage further includes means for providing an internal control signal at the end of said predetermined recovery period whenever said stage is nulled by said nulling means.

15. A data shifting system as recited in claim 3 wherein said stage means include nulling means for nulling the data stored in said data-storing means of said stage whenever the time period between said first and second control signals of said series of control signals supplied to said control signal means of said stage is less than a recovery time period of said stage.

16. A data shifting system as recited in claim 3 wherein said stage further includeas means for providing an internal control signal at the end of said predetermined recovery period whenever said stage is nulled by said nulling means.

17. In a controlled data shifting system wherein data is shifted between stages arranged in a predetermined succession in response to control signals successively supplied in a series of control signals the arrangement comprising a plurality of stages, each stage having input and output data terminals and input and output control signals terminals; means connecting the input data terminal of one of said stages to the output data terminals of at least two other stages of said plurality of stages; means connecting the output control signal terminal of said one of said stages to the input control signal terminals of at least said two other stages; means for applying a first control signal to said one of said stages through the input control signal terminal thereof; means within said one of said stages for regenerating said first control signal therein; means for controlling the supply of said regenerated first control signal to each of said two other stages as a function of the data stored therein; and means within said one of said stages and said two other stages for controlling the data stored therein as a function of the time between said first control signal and a subsequent control signal supplied to each of said stages.

18. In a controlled data shifting system wherein data is shifted between stages arranged in a predetermined succession in response to control signals successively supplied in a series of control signals the arrangement comprising a plurality of stages, each stage having input and output data terminals and input and output control signal terminals; means connecting the output data terminal of one of said stages to the input data terminals of at least two other stages; means connecting the input control signal terminal of said one of said stages to the output control signal terminals of at least said two other stages; means in each of said plurality of stages for storing data; means in each of said two stages for storing therein the data stored in said one stage; means for inhibiting each of said two stages from storing therein more than one time the same data stored in said one stage; means for applying control signals from said two stages to said one stage when said two stages store data stored in said one stage, said one stage being responsive thereto so as to store data supplied thereto from a preceding stage of said plurality of stages arranged in said predetermined succession.

References Cited

UNITED STATES PATENTS 3,108,228 10/1963 Clapper ---------- 328—37 X

JOHN S. HEYMAN, *Primary Examiner.*

ARTHUR GAUSS, *Examiner.*